US011757839B2

(12) United States Patent
Cobb (10) Patent No.: US 11,757,839 B2
(45) Date of Patent: Sep. 12, 2023

(54) VIRTUAL PRIVATE NETWORK APPLICATION PLATFORM

(71) Applicant: Jonathan Cobb, Charlotte, NC (US)

(72) Inventor: Jonathan Cobb, Charlotte, NC (US)

(*) Notice: Subject to any disclaimer, the term of this patent is extended or adjusted under 35 U.S.C. 154(b) by 75 days.

(21) Appl. No.: 17/170,575

(22) Filed: Feb. 8, 2021

(65) Prior Publication Data
US 2021/0273914 A1 Sep. 2, 2021

Related U.S. Application Data (60) Provisional application No. 62/982,902, filed on Feb. 28, 2020.

(51) Int. Cl.
H04L 9/40 (2022.01)

(52) U.S. Cl.
CPC ...... *H04L 63/0272* (2013.01); *H04L 63/0435* (2013.01); *H04L 63/1416* (2013.01); *H04L 63/1483* (2013.01); *H04L 63/166* (2013.01)

(58) Field of Classification Search
CPC .............. H04L 63/166; H04L 63/1483; H04L 63/1416; H04L 63/0435; H04L 63/0272; H04L 63/0281; H04L 63/0428; H04L 63/0464; H04L 63/0227; H04L 63/0245; H04L 63/306; H04L 63/14; H04L 63/1408; H04L 2209/76; H04L 51/212; H04L 51/214
USPC ......................................................... 726/22
See application file for complete search history.

(56) References Cited

U.S. PATENT DOCUMENTS

| 8,739,243 | B1* | 5/2014 | Martini | H04L 63/306 726/1 |
| 8,799,641 | B1* | 8/2014 | Seidenberg | H04L 63/0281 713/168 |
| 8,856,869 | B1* | 10/2014 | Brinskelle | H04L 63/0823 726/2 |
| 9,680,801 | B1* | 6/2017 | Martini | H04L 67/141 |
| 2007/0260871 | A1* | 11/2007 | Paya | H04L 63/145 713/151 |
| 2010/0146260 | A1* | 6/2010 | Levow | H04L 63/0464 713/154 |
| 2011/0264905 | A1* | 10/2011 | Ovsiannikov | H04L 63/0281 713/151 |
| 2014/0095865 | A1* | 4/2014 | Yerra | H04L 9/3271 713/156 |
| 2014/0304498 | A1* | 10/2014 | Gonuguntla | H04L 63/0281 713/151 |
| 2016/0127414 | A1* | 5/2016 | Mazur | H04L 63/0428 713/151 |
| 2016/0142440 | A1* | 5/2016 | Qian | H04L 63/1425 713/151 |

(Continued)

OTHER PUBLICATIONS https://mitmproxy.org/.
https://wireguard.com/.

*Primary Examiner* — Tae K Kim
(74) *Attorney, Agent, or Firm* — Edlavitch Law PLLC (57) ABSTRACT

Systems and methods for overcoming technical problems associated with virtual private networks and application provisioning systems to provide ways for end-users and/or providers to control access, use, and communications associated with websites, online applications, and online services. Such systems and methods leverage techniques analogous to technologies known for implementing man-in-the-middle (MITM) attacks.

21 Claims, 6 Drawing Sheets

(56) References Cited

U.S. PATENT DOCUMENTS

| | | | |
|---|---|---|---|
| 2017/0244633 A1* | 8/2017 | Krishnan | H04L 45/56 |
| 2018/0351997 A1* | 12/2018 | Lee | H04L 67/01 |
| 2019/0028439 A1* | 1/2019 | Moore | H04L 63/302 |
| 2019/0356694 A1* | 11/2019 | Wang | H04L 63/0823 |
| 2020/0145456 A1* | 5/2020 | Fugate | H04L 63/0464 |
| 2020/0304476 A1* | 9/2020 | Moore | H04L 63/0272 |
| 2020/0358879 A1* | 11/2020 | Shribman | H04L 63/029 |
| 2021/0006544 A1* | 1/2021 | Lewin | H04L 63/20 |
| 2021/0067494 A1* | 3/2021 | Azulay | H04L 63/1466 |
| 2021/0218714 A1* | 7/2021 | Wang | H04L 63/166 |
| 2021/0344511 A1* | 11/2021 | Devarajan | H04L 63/1416 |

* cited by examiner

```
Establishing, by a computing system, a TCP connection between a client device and an app or website server
302
                                        ↓
Intercepting, by the computing system, a request to change the TCP connection to a SSL/TLS connection
between the client device and the server
304
                                        ↓
Establishing, by the computing system, a SSL/TLS connection with the server between the computing system
and the server according to the request
306
                                        ↓
Validating, by the computing system, an original digital certificate sent from the server after the SSL/TLS
connection between the computing system and the server has been established
308
                                        ↓
Generating, by the computing system, a surrogate digital certificate according to the original certificate
310
                                        ↓
Sending to the client device, by the computing system, a reply to the request with the surrogate certificate
312
                                        ↓
Controlling, by the computing system, communications between the client device and the server
314
```

VIRTUAL PRIVATE NETWORK APPLICATION PLATFORM

CROSS-REFERENCE TO RELATED APPLICATIONS

The present application claims the benefit of priority from U.S. Provisional Patent Application No. 62/982,902, filed on Feb. 28, 2020 and entitled "Methods and Systems for a Virtual Private Network Application Platform", the entire disclosure of which application is hereby incorporated herein by reference.

TECHNICAL FIELD

The present disclosure relates to virtual private networks and application provisioning systems. Some embodiments also relate to technology that can implement man-in-the-middle attacks that are done in good faith.

BACKGROUND

A virtual private network (VPN) is a private computer network that is extended over a public network, such as the Internet. A VPN allows for its users to communicate data over public networks as if computing devices of the users were directly connected to the private network. Applications distributed through a VPN can benefit from the security and management provided by a private network and such applications can originate from servers that communicate over a public network, such as the Internet. Typically, communications over a VPN connection are encrypted.

VPN technology was developed to provide access to private applications and resources to remote users via the Internet. The private network connection can use an encrypted layered tunneling protocol, and users are typically required to pass authentication methods to gain access to the VPN. Also, Internet users can secure their connections with a VPN to circumvent or add network restrictions or to connect to protect personal identity and/or location to stay anonymous. Some websites, however, block access to known IP addresses used by VPNs to prevent the circumvention of their restrictions.

In short, a VPN establishes a virtual point-to-point connection through the use of dedicated circuits or with tunneling protocols over existing networks. A VPN configured to run over the Internet can provide some of the benefits of a wide area network (WAN) and allow user to use private resources and applications remotely and more securely. And, there are tradeoffs to using VPNs (such as slower connections); however, it seems that the benefits of a VPN outweigh the tradeoffs in most circumstances where VPNs are used.

Also related to cybersecurity, but usually thought of as malicious technology, are man-in-the-middle attacks. A man-in-the-middle (MITM) attack is a cyberattack where the attacker secretly relays and possibly alters the communications between two parties in such a way to deceive the two parties into believing that they are directly communicating with each other. With that said, a MITM technology is a technology that can implement an MITM attack whether or not the attack is malevolent or in good faith. An example of a MITM attack is active eavesdropping, in which the attacker connects independently with the deceived parties and relays messages between them to make the parties believe they are talking directly to each other over a connection, when in fact the communications are controlled by the attacker. Such an attacker, whether malicious or acting in good faith or at least one of the parties, must be able to intercept all relevant messages passing between the two parties and provide new ones into the communications.

As it can be imagined, not all MITM attacks and technology have fraudulent or malicious intent. And, it may be beneficial to leverage the technologies that have evolved from MITM attacks to improve or add upon functionalities of virtual private networks and application provisioning systems. Such technologies may improve the observation and manipulation of network traffic between parties that leverage the Internet and other shared and public networks to provide websites, applications, and services online. For instance, it may be beneficial for end-users to control their access, use, and communications with such websites, applications, and services. On the other hand, it may be beneficial for the providers of websites, applications, and online services to control user access and interactions.

SUMMARY

Described herein are improved systems and methods for overcoming technical problems associated with virtual private networks and application provisioning systems to provide ways for end-users and/or providers to control access, use, and communications associated with websites, applications, and online services. Such systems and methods leverage techniques analogous to technologies known for implementing man-in-the-middle (MITM) attacks.

Some embodiments described herein include methods and systems for providing a virtual private network application platform (VPNAP). The VPNAP can include a virtual private network (VPN) and a MITM component, such as a transport layer security interception service. A MITM component is a service or technology that uses techniques utilized by malicious actors to perform MITM attacks but for the benefit of at least one of the parties involved in the communications intercepted and controlled by the MITM component or for the benefit of a party that is acting in good faith.

With the VPNAP, the VPN can be configured to establish a transmission control protocol (TCP) connection between a client device and an application or website server. The MITM component can include a MITM device that implements the MITM component and thus can be configured to intercept a request to change the TCP connection to a secure sockets layer or transport layer security (SSL/TLS) connection between the client device and the server as well as establish an SSL/TLS connection with the server according to the request. The MITM device can also be configured to validate an original digital certificate sent from the server and generate a surrogate digital certificate according to the original certificate. Also, the MITM device can be configured to send, to the client device, a reply to the request with the surrogate certificate. The reply can imitate the server replying to the request of the client device. And, the client device can include a pre-installed trusted certificate authority certificate (CA Certificate) from the VPNAP. This allows the client device to validate the surrogate certificate so that the client device can communicate with the server and the MITM device can act as a controlling intermediate layer to the client device and the server. Thus, the MITM device can be further configured to control communications between the client device and the server according to the surrogate certificate.

In summary, the systems and methods (or technologies) disclosed herein can provide specific technical solutions to at least overcome the technical problems mentioned in the background section and other parts of the application as well as other technical problems not described herein but recognized by those skilled in the art and related to improved control of private networks and application provisioning systems.

With respect to some embodiments, disclosed herein are computerized methods for improved control of private networks and application provisioning systems, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for novel and improved control of private networks and application provisioning systems.

With respect to some embodiments, a system is provided that includes at least one computing device configured to provide useful and novel control of private networks and application provisioning systems. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

BRIEF DESCRIPTION OF THE DRAWINGS

The present disclosure will be understood more fully from the detailed description given below and from the accompanying drawings of various embodiments of the disclosure. It is to be understood that the accompanying drawings presented are intended for the purpose of illustration and not intended to restrict the disclosure.

DETAILED DESCRIPTION

Described herein are improved systems and methods for overcoming technical problems associated with virtual private networks and application provisioning systems to provide ways for end-users and/or providers to control access, use, and communications associated with websites, applications, and online services. Such systems and methods leverage techniques analogous to technologies known for implementing man-in-the-middle (MITM) attacks.

Some embodiments described herein include methods (e.g., see FIGS. 2 to 5) and systems (e.g., see FIGS. 1 and 6) for providing a virtual private network application platform (VPNAP). The VPNAP can include a virtual private network (VPN) and a MITM component, such as a transport layer security interception service. A MITM component is a service or technology that uses techniques utilized by malicious actors to perform MITM attacks but for the benefit of at least one of the parties involved in the communications intercepted and controlled by the MITM component.

Figure 1:
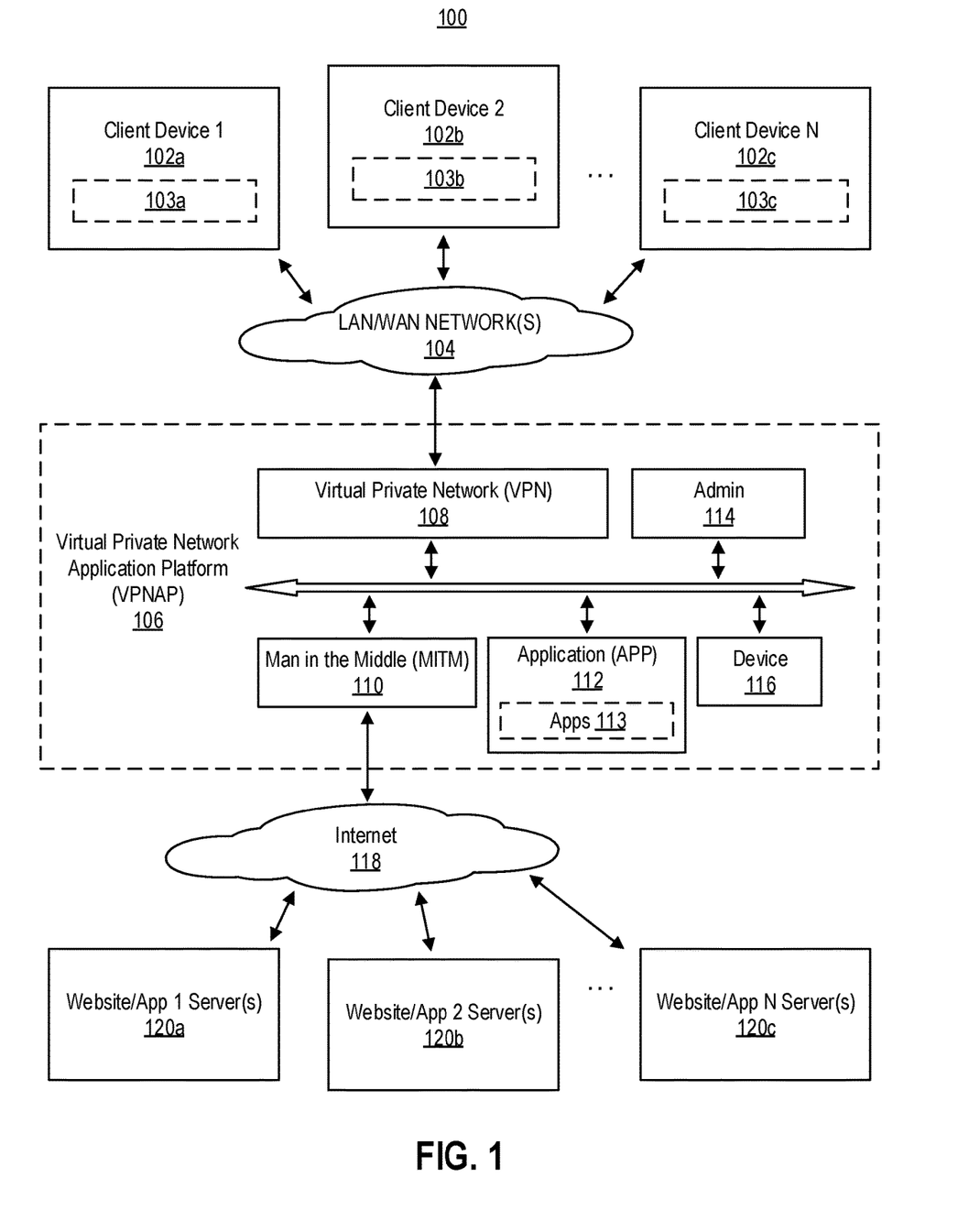
FIG. 1 illustrates an example network of computing systems to implement control of private networks and application provisioning systems, in accordance with some embodiments of the present disclosure.

With the VPNAP (e.g., see VPNAP 106 shown in FIG. 1), the VPN can be configured to establish a transmission control protocol (TCP) connection between a client device and an application or website server (e.g., see client devices 102*a* to 102*c* and servers 120*a* to 120*c* shown in FIG. 1). The MITM component (e.g., see MITM component 110 shown in FIG. 1) can include a MITM device that implements the MITM component and thus can be configured to intercept a request to change the TCP connection to a secure sockets layer or transport layer security (SSL/TLS) connection between the client device and the server as well as establish an SSL/TLS connection with the server according to the request. The MITM device can also be configured to validate an original digital certificate sent from the server and generate a surrogate digital certificate according to the original certificate. Also, the MITM device can be configured to send, to the client device, a reply to the request with the surrogate certificate. The reply can imitate the server replying to the request of the client device. And, the client device can include a pre-installed trusted certificate authority certificate (CA Certificate) from the VPNAP. This allows the client device to validate the surrogate certificate so that the client device can communicate with the server and the MITM device can act as a controlling intermediate layer to the client device and the server. Thus, the MITM device can be further configured to control communications between the client device and the server according to the surrogate certificate. E.g., see workflow 300 of FIG. 3, which is a workflow for commencing the aforesaid communications and security tasks via a computing system—such as a computing system of the MITM device; and see workflows 400 and 500 of FIGS. 4 and 5, respectively, which are workflows for controlling communications between a client device and a server via a computing system—such as a computing system of the MITM device.

In some embodiments, a set of related operations (e.g., allow, block, or modify a communication) along with a set of rules for when to perform such operations can be grouped into a VPN app of the VPNAP. Also, in such embodiments, a VPN app can include a name, description and other metadata associated with it to allow end-users to understand its intended usage and how to configure it. The end users of the VPNAP in such embodiments and others can install, uninstall, configure, activate or deactivate one or more VPN apps. Configuration for VPN apps can be scoped to the entire VPNAP, to a single end-user, or to a single end-user computing device. When multiple VPN apps are installed, they can operate independently or in concert, depending on the VPN app configuration. Also, with the VPNAP, the VPN apps that can be installed are not limited to those created by the vendor of the VPNAP. In addition to VPN apps that can be included with the VPNAP, some VPN apps can be installed to the be used with the VPNAP via an on-demand installation from a VPNAP vendor or another type of vendor. In other words, third-party VPN apps may be installed to be integrated with the VPNAP. Also, first-party VPN apps may be developed and installed with the VPNAP.

One example benefit of the VPNAP is to gain the ability to observe and/or manipulate network traffic between an end-user's networked devices and other online or networked websites, applications or other services. Users can gain visibility into the network traffic that their connected devices are sending and receiving. Also, users gain the ability to block and/or modify any network traffic to and/or from their devices. The traffic manipulation rules can be configured via applications interacting with VPNAP, and each of the rules can present one or more coherent functions. Also, the platform can interact with multiple applications that can be installed by a user. By using such applications, users can choose to have their devices block receiving unwanted advertising and prohibit sending out behavioral tracking information. Applications interacting with the VPNAP may block network traffic by user's devices to websites that are known to host viruses, malware, phishing scams, and other user-hostile technologies.

The VPNAP, e.g., see virtual private network application platform (VPNAP) 106 shown in FIG. 1, can include a VPN component, e.g., see virtual private network (VPN) component 108 depicted in FIG. 1, which provides VPN services to connected devices. The VPNAP can include an MITM component, e.g., see man-in-the-middle (MITM) component 110 depicted in FIG. 1, which enforces traffic rules as directed by VPNAP applications. The VPNAP can include an app component (e.g., see application component 112 depicted in FIG. 1), which manages the installed VPNAP applications. The VPNAP can include an admin component (e.g., see admin component 114 depicted in FIG. 1), which provides an administrative user interface to the VPNAP. The VPNAP can include a device component as well (e.g., see device component 116 depicted in FIG. 1), which manages adding and removing devices from the VPNAP.

FIG. 1 illustrates an example network of computing systems 100 to implement control of private networks and application provisioning systems, in accordance with some embodiments of the present disclosure. To put it another way, FIG. 1 shows a diagram of an example architecture for implementing and interacting with virtual private network application platform (VPNAP) 106. The example network of computing systems 100 can implement any of the aforesaid components and operations as well as any component or operation described herein.

The network of computing systems 100 is shown including client devices of different customers or end users (e.g., see client devices 102a, 102b, and 102c). Each of the client devices can store, in data storage devices or in memory, instructions for a client-side aspect of an application and VPNAP 106 (e.g., see client-side aspects 103a, 103b, and 103c). The network of computing systems 100 is also shown including at least one local area network (LAN) and at least one wide area network (WAN) communicatively coupling the client devices with the VPNAP 106 via a VPN component 108 (e.g., see LAN/WAN network(s) 104). As shown, the VPN component 108 is a part of the VPNAP 106. The network of computing systems 100 is also shown including the Internet 118 (which can include at least one local area network (LAN) and/or at least one wide area network (WAN)) communicatively coupling the VPNAP 106 with respective one or more server devices of different website or online application providers (e.g., see server(s) 120a, 120b, and 120c) via a man-in-the-middle (MITM) component 110. As shown, the MITM component 110 is a part of the VPNAP 106. Each of the server devices of the different website or online application providers can store, in data storage devices or in memory, instructions for a website and/or online application as well as some server-side aspects of the VPNAP 106 in some embodiments. Also, each of the components of the VPNAP 106 (e.g., see VPN component 108, MITM component 110, application component 112, admin component 114, and device component 116) can store, in data storage devices or in memory, instructions for corresponding technical aspects of the VPNAP 106.

The LAN/WAN network(s) 104 can include the Internet and/or any other type of interconnected communications network. The LAN/WAN network(s) 104 can also include a single computer network or a telecommunications network. More specifically, the LAN/WAN network(s) 104 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN. The LAN/WAN network(s) 104 and the Internet 118 can be a part of the same greater network or parts of greater separate networks. And, in some embodiments, the LAN/WAN network(s) 104 and the Internet 118 can be the same or overlapping network(s).

At least each shown component of the network of computing systems 100 can be or include a computing system which can include memory that can include media. The media can include or be volatile memory components, non-volatile memory components, or a combination of such. In general, each of the computing systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

FIG. 1 shows end user's devices (e.g., see client devices 102a, 102b, 102c), which connect to the Internet 118 via some bandwidth provider, for example a cellular mobile carrier or a home DSL or cable Internet service (e.g., see the LAN/WAN network(s) 104). FIG. 1 also shows websites and application services that the end-user's web browser and native apps would like to communicate with (e.g., see server(s) 120a, 120b, and 120c, which are respective server(s) of different website and online application providers).

In some embodiments, the VPNAP 106 or at least part of it can physically run on one or more servers on the Internet 118. In some other embodiments, the VPNAP 106 runs on servers(s) separate from the Internet 118. Within the VPNAP 106, the VPN component 108 can handle secure connections from end-user devices, and upstream routing of Internet traffic. Once a device is securely connected to the VPN enabled by the VPN component 108, the bandwidth provider no longer has any visibility into the network traffic. For example, the network traffic through the VPN can be encrypted between a device and the VPN. Similarly, the websites and app services provided by provider servers (e.g., see server(s) 120a, 120b, and 120c) are no longer able to trace the connection all the way back to its origin and see the traffic generated by the end-user devices as traffic coming from the VPN. Moreover, website and apps are running on the VPN provided by the VPN component 108, and network traffic is additionally forwarded through the MITM component 110. By forwarding network traffic through the MITM component 110, the websites and apps running on the VPN provided by the VPN component 108 can block or modify any of such network traffic via the MITM component.

In some embodiments, the VPN provided by the VPN component 108 extends a secure private network over a public untrusted network (such as a public part of the Internet 118). The VPN can allow connected users and systems to communicate securely, even over an insecure network. The VPN can also allow a business or organization to connect disparate computer networks into one unified virtual network. For example, a company can have a main headquarters and many geographically distributed branch offices and the headquarters and branch offices each can have their own private local network via the VPN or sub-VPNs provide via the VPN component 110. These VPNs can connect to the public part of the Internet 118, and by connecting these private networks to a companywide VPN running at headquarters, the branch offices can access networked resources at company headquarters that are not accessible over the public Internet 118 alone. The provided VPN can also be used by consumers to enhance their privacy and/or make their network traffic appear to originate from a different location than their devices. For example, a user in China may wish to access a website that is blocked by a Chinese firewall and by connecting to a VPN outside China, they can possibly access the website. From the website's perspective, the end user is not in China, they are wherever the VPN node is located. From the perspective of the Chinese firewall, the end user has not connected to the website, they are only connected to the VPN node. Because traffic between the end user node and the VPN node can be encrypted by a component of the VPNAP (such as the MITM component 110), the Chinese firewall or any other firewall cannot read the traffic to understand which website(s) the end user is accessing.

Also, within the VPNAP 106, the admin component 114 provides administrative interfaces to the VPNAP. For instance, the admin component 114 can provide the ability to manage and use apps and websites and can add and remove client and/or server-side devices. Within the VPNAP 106, the application component 112 manages the apps that are installed on the VPNAP (e.g., see apps 113). Some apps can be preinstalled on the VPNAP 106. Other apps can be installed via an app store accessible from the VPNAP or installed independently by the VPNAP admin component 114. Within the VPNAP 106, the device component 116 provides services to add, remove and manage devices that use the VPNAP. Any number of devices can connect to the VPNAP. Devices can be organized by user account or other means.

Applications managed by the application component 112 (e.g., see apps 113) can each direct the MITM service separately to allow, block, or modify network requests and responses. The specifics of such direction can depend on how each app is configured. The apps managed by the app component and/or stored by a device implementing the VPNAP 106 can include a network monitor, a network filter, a user blocker, and/or a file saver. The network monitor can allow network traffic to proceed, but also logs information associated with the traffic such as information in and associated with requests. Via the admin component 114, a user can review the logged network traffic. The network filter uses a list of rules to determine if network traffic should be blocked. A rule can specify a match on a hostname, a URL path, a port number, an HTTP header, or any other information that can be read from the network traffic. The action to take upon a match can also be configurable, for example, to return a "404 Not Found" error, to drop a network connection, or to take another action. A common use would be to block traffic to domains commonly known to host spyware, malware, or other malicious software. The user blocker can inject HTML and JavaScript or another form of instructions into online discussion forums or other online chat methods to allow users of the VPNAP to block other users on the discussion forum or chat. When a user is blocked, their comments are removed from the HTML document that is presented to the VPNAP user. The users who are blocked have no way of knowing they are blocked, because the block is implemented within the VPNAP, not on the discussion site itself. The file saver is an app that can watch network traffic for certain file types, for example, PDF documents, and saves a copy to a folder on the VPNAP. Using the admin component 114 and application component 112, the VPNAP user can review the saved files without having to re-download them from the original website or online service.

In some embodiments, the aforesaid system or a related system can implement novel methods for overcoming technical problems associated with virtual private networks and application provisioning systems to provide ways for end-users and/or website or online app providers to control access, use, and communications associated with websites, applications, and online services. Such methods can include a method that includes a network exchange required to establish a TCP connection (e.g., see steps 210 to 216 shown in FIG. 2). For example, an end user's device requesting a TCP network connection to a remote host (HTTPS website or application). E.g., see step 210. Before the end user's request arrives at the website or app, it must pass through MITM component 204, which implements secure sockets layer interception (SSLI) and/or MITM. The MITM component 204 requests a connection to the website or app on behalf of the end user. E.g., see step 212. The website or app establishes a TCP connection with the MITM component 204, which is masquerading as the end user. E.g., see step 214. Then, the MITM component 204 establishes a TCP connection with the end user. E.g., see step 216.

Figure 2:
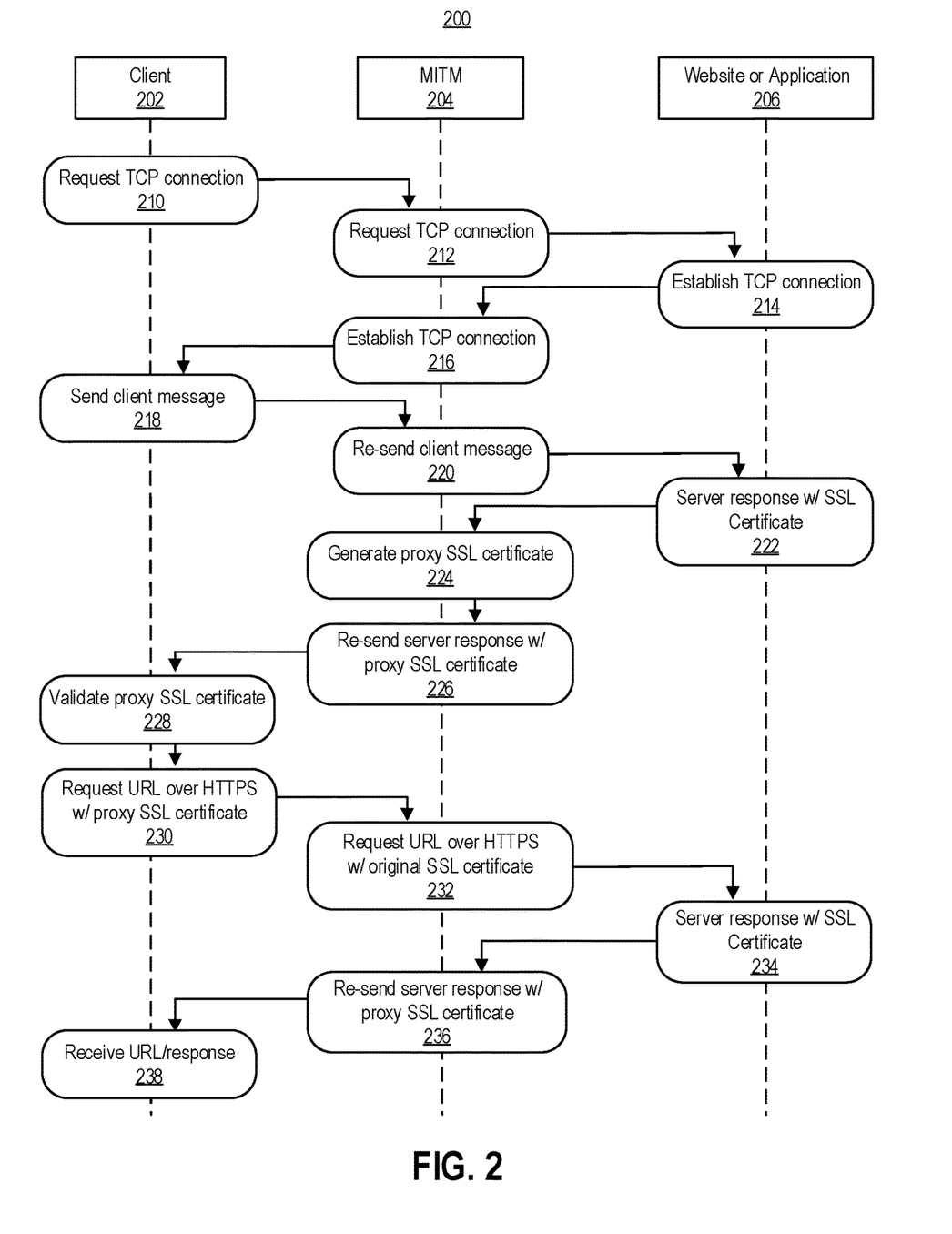
FIG. 2 illustrates an example workflow for controlling and commencing control of private networks and application provisioning systems, in accordance with some embodiments of the present disclosure.

The method can also include an end user's device (e.g., client 202) seeking to upgrade the TCP connection to a secure SSL/TLS connection (e.g., see step 218 shown in FIG. 2). The method can also include the MITM component 204 intercepting the request of the end user and establishing its own secure connection to the website or online application (e.g., see steps 220 and 222 shown in FIG. 2). The method can also include the MITM component 204 inspecting and validating the SSL certificate that the website or online app presented to ensure secure communication. The MITM component 204 then generates its own surrogate certificate, based on the website's or online app's certificate. The surrogate certificate of the MITM component 204 claims to represent the website or online app. E.g., see step 224. The MITM component 204 can then send the SSL reply to the end user, using the surrogate certificate to impersonate the website or app. E.g., see step 226.

The method can also include the end user validating the certificate received from the MITM component 204. E.g., see step 228 shown in FIG. 2. In normal SSL/TLS operation, this is where the MITM scheme would fail. However, the end user's computing system has several pre-installed trusted certificate authority certificates (CA Certs). These trusted CA certs can be used to validate website or online app certificates presented to the end user. Without the pre-installed CA cert from the VPNAP, the surrogate certificate of the MITM component 204 will fail validation because it was not signed by a certificate authority that the end user's device trusts. The End User will likely see a large warning message in their browser or application indicating that the website or app should not be trusted, because its certificate could not be validated. However, if the end user has installed and trusts the CA cert that the MITM component used to generate the surrogate certificate (a certificate of the VPNAP), then the certificate will be successfully validated, and communications will continue. The method can also include the continued communications between the end user and the website or app, mediated by the MITM component 204. The MITM component 204 can decrypt and re-encrypt each message in both directions, allowing it to inspect or modify any network traffic passing in either direction. E.g., see steps 230 to 238 shown in FIG. 2.

As mentioned herein, FIG. 2 illustrates an example workflow 200 for controlling and commencing control of private networks and application provisioning systems, in accordance with some embodiments of the present disclosure. More specifically, FIG. 2 shows a diagram of example operations of a SSLI or MITM technology according to some embodiments of the present disclosure.

The steps of workflow 200 are implemented by technical aspects of client 202 (e.g., see client device 102*a*), MITM component 204 (e.g., see MITM component 110), and website or online application 206 (e.g., which can be a website or online application served by server(s) 120*a*). The MITM component 204 can perform SSLI which can include the ability to intercept and decrypt network communications that have been encrypted with secure sockets layer (SSL), transport layer security (TLS), or similar technologies. The MITM component 204 can include technical aspects that can interact with a network topology wherein two computer systems believe they are communicating directly and securely with each other, but in fact there is a third system (the MITM component 204) intercepting and relaying traffic between the two systems. The MITM component 204 can read and modify any messages communicated between the two systems. Traditionally, SSLI and MITM techniques have been employed by criminals and espionage organizations to spy on the network traffic of a victim or a person who is the target of an espionage operation. Less frequently, end users may operate SSLI/MITM locally to inspect their own network traffic to/from secure websites and other online services.

The workflow 200, at step 210, commences with client 202 requesting a TCP connection with website or online application 206. The workflow 200, at step 212, continues with MITM component 204 requesting a TCP connection with the website or online application 206 for the client 202. At step 214, the website or online application 206 establishes a TCP connection with the MITM component 204. At step 216, the MITM component 204 establishes the TCP connection with the client 202; and thus, masquerades as the client to the website or online app and as the website or online app to the client.

At step 218 of workflow 200, the client 202 sends a client message to the MITM component 204 with an intent to message (such as a request) the website or online application 206. The MITM component 204, at step 220, then resends the client message to the website or online app 206. Thus, fulfilling the intent of the client 202. In response to a request for a secure connection, the website or online app 206 can send a server message with an SSL certificate, at step 222. At step 224, the MITM component 204 intercepts the server message with the SSL certificate and generates a proxy SSL certificate (also referred to herein as a surrogate certificate) based on the received certificate. And, at step 226, the MITM component 204 resends the server message with the proxy SSL certificate to the client 202. At step 228, the client 202 validates the proxy SSL certificate as if it were the cert from the website or online app 206. For this step to operated correctly, the end user must have installed and trusts the CA cert that the MITM component used to generate the proxy SSL certificate. After such validation, communications can continue.

At step 230 of workflow 200, the client 202 requests a URL over HTTPS with the proxy SSL certificate. And, a step 232, the MITM component 204 uses the request of the client to base a request for the URL over HTTPS with the original SSL certificate sent by the website or online app 206. The MITM component 204 resends the request for the URL over HTTPS but with the original SSL certificate. The website or online app 206 then responds to the request with the original SSL certificate at step 234 and the response is intercepted by the MITM component 204 at step 236. Also, at step 236, the MITM component 204, resends the server response but with the proxy SSL certificate. The response is resent to the client 202, which then receives the requested URL and resent response at step 238. Once again, the client 202 validates the proxy SSL certificate as if it were the cert from the website or online app 206.

Figure 3:
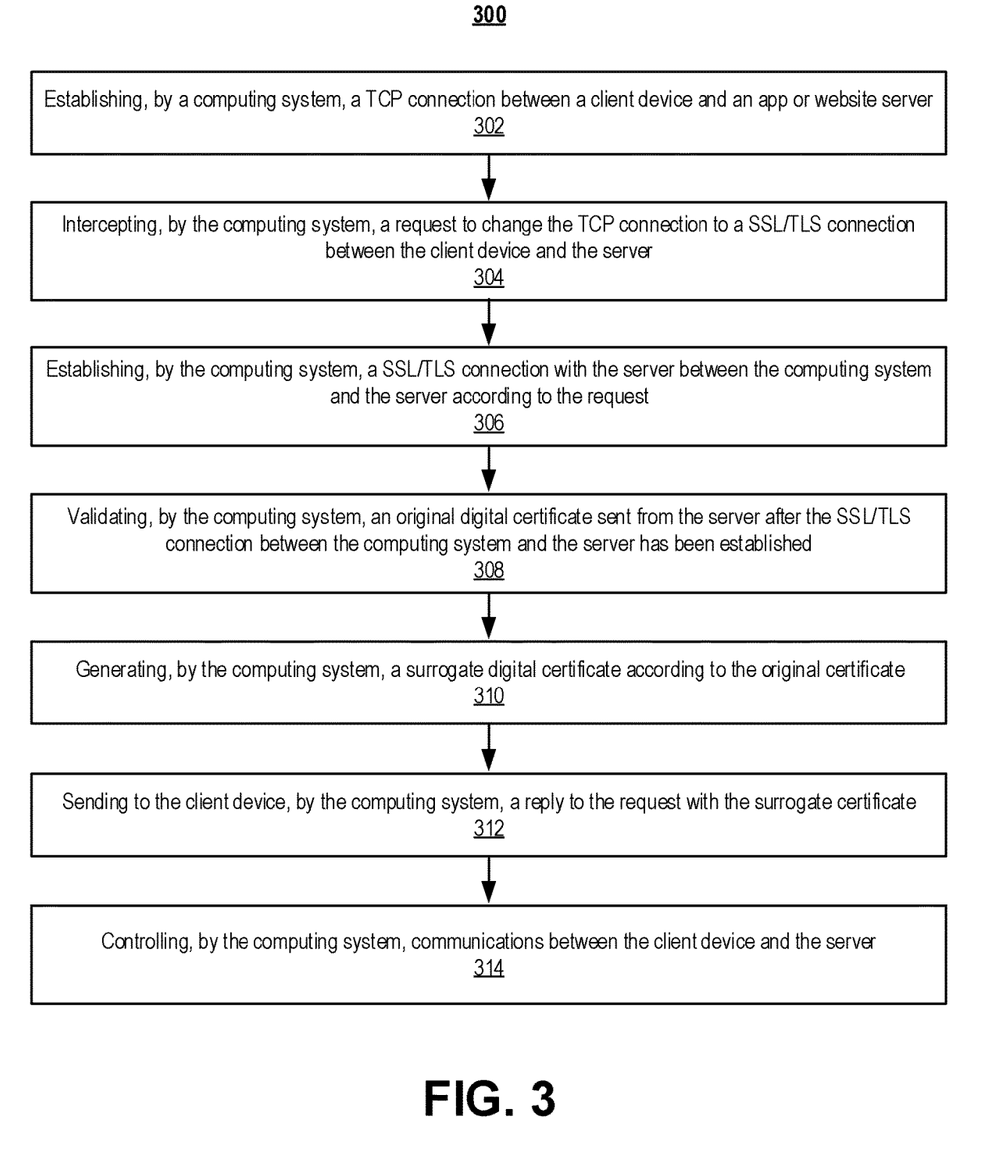
FIG. 3 illustrates an example workflow for commencing control of private networks and application provisioning systems by a computing system, such as a computing system of a virtual private network application platform (VPNAP), in accordance with some embodiments of the present disclosure.

FIG. 3 illustrates another example workflow 300 for commencing control of private networks and application provisioning systems by a computing system, such as a computing system of a VPNAP, in accordance with some embodiments of the present disclosure. The workflow 300 commences at step 302 with establishing, by the computing system, a TCP connection between a client device and a server for a website, online app, or online service. At step 304, the workflow 300 continues with intercepting, by the computing system, a request to change the TCP connection to an SSL/TLS connection between the client device and the server, subsequent to the TCP connection being established between the client device and the server. At step 306, the workflow 300 continues with establishing, by the computing system, an SSL/TLS connection with the server between the computing system and the server according to the request. At step 308, the workflow 300 continues with validating, by the computing system, an original digital certificate sent from the server after the SSL/TLS connection between the computing system and the server has been established. At step 310, the workflow 300 continues with generating, by the computing system, a surrogate digital certificate according to the original certificate. At step 312, the workflow 300 continues with sending to the client device, by the computing system, a reply to the request, with the surrogate certificate. The reply imitates the server replying to the request of the client device, and the client device includes a pre-installed trusted certificate authority certificate generated by or from the computing system. The pre-installed trusted certificate authority certificate can be generated by or from a MITM component of the VPNAP, in some embodiments. At step 314, the workflow 300 continues with controlling, by the computing system, communications between the client device and the server according to the surrogate certificate.

Figure 4:
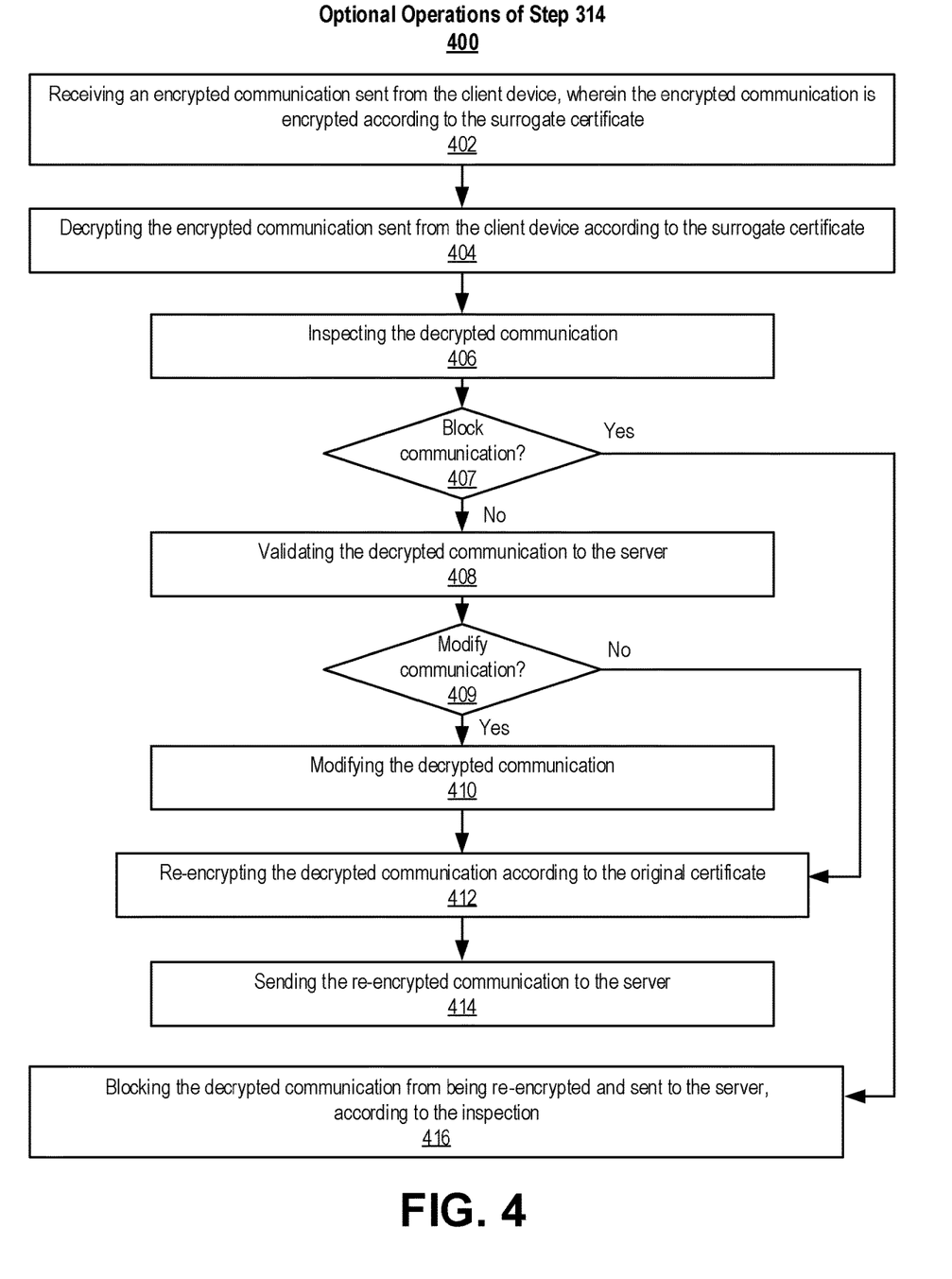
FIGS. 4 and 5 illustrate example workflows for controlling private networks and application provisioning systems by a computing system, such as a computing system of a VPNAP, in accordance with some embodiments of the present disclosure.
Figure 5:
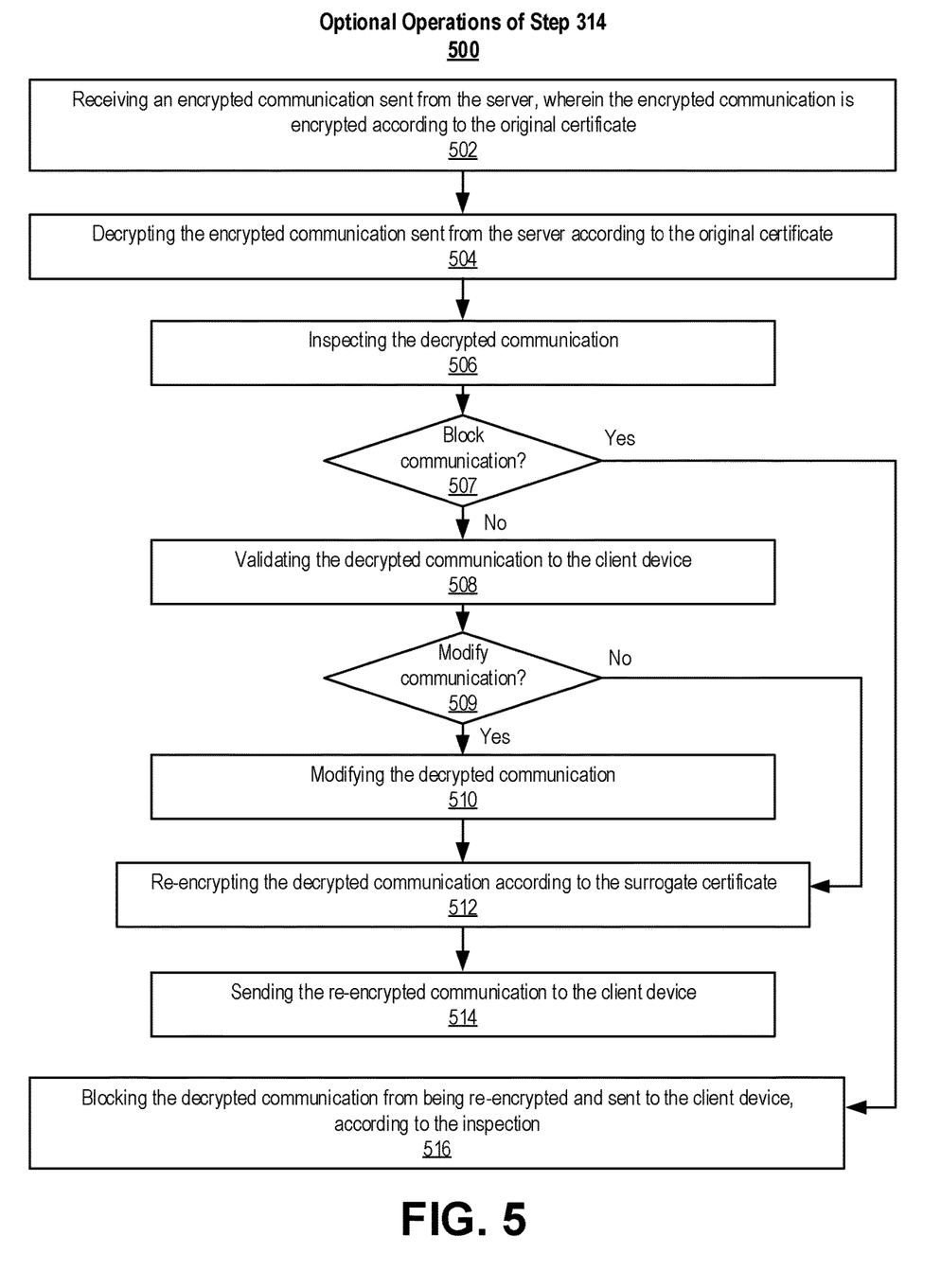

FIGS. 4 and 5 illustrate respective example workflows 400 and 500 for controlling private networks and application provisioning systems by a computing system, such as a computing system of a VPNAP, in accordance with some embodiments of the present disclosure. Each of the workflows can include operations included in step 314 of workflow 300.

Specifically, as shown in FIG. 4, workflow 400, at step 402, commences with receiving, by the computing system, an encrypted communication sent from a client device, such as the client device from workflows 300 and 500. The encrypted communication is encrypted according to a surrogate certificate, such as the surrogate certificate generated in workflow 300. The encryption prior to step 402 can occur at the client device. The workflow 400, at step 404, then continues with decrypting, by the computing system, the encrypted communication sent from the client device according to the surrogate certificate. The workflow 400, at step 406, then continues with inspecting, by the computing system, the decrypted communication (which was originally sent from the client device).

At step 407, the workflow 400 continues with the computing system determining whether or not to block the decrypted communication (originally sent from the client device) according to a set of rules. If it determines to block the communication, then the workflow 400 continues with blocking the communication from being re-encrypted and sent to the server, according to the inspection (at step 416). If it determines not to block the communication, the workflow 400 continues with validating the decrypted communication to the server (at step 408).

The workflow 400, at step 409, continues with the computing system determining whether or not to modify the decrypted communication (originally sent from the client device) according to instructions from the client, the server, or the MITM component, and/or a set of rules stored in the computing system. If it determines to modify the communication, then the workflow 400 continues with modifying the communication according to the instructions from the client, the server, or the MITM component, and/or a set of rules stored in the computing system (at step 410). If it determines not to block the communication, the workflow 400 skips a modification of the communication and continues with re-encrypting the decrypted communication according to the original certificate (at step 412). Either way, if the computing system determines that the communication is not to be blocked, the workflow 400 will eventually proceed with re-encrypting, by the computing system, the decrypted communication (originally sent from the client device) according to the original certificate (at step 412).

Finally, at step 414, the workflow 400 continues with the computing system sending the re-encrypted communication to the server. The re-encrypted communication includes the same message, or a derivative of the message originally sent from the client device.

Specifically, as shown in FIG. 5, workflow 500, at step 502, commences with receiving, by the computing system, an encrypted communication sent from a server of an online application or website, such as a server from workflows 300 and 400. The encrypted communication is encrypted according to the original certificate, such as the original certificate used in workflows 300 and 400. The encryption prior to step 502 can occur at the server. The workflow 500, at step 504, then continues with decrypting, by the computing system, the encrypted communication sent from the server according to the original certificate. The workflow 500, at step 506, then continues with inspecting, by the computing system, the decrypted communication (which was originally sent from the server).

At step 507, the workflow 500 continues with the computing system determining whether or not to block the decrypted communication (originally sent from the server) according to a set of rules. If it determines to block the communication, then the workflow 500 continues with blocking the communication from being re-encrypted and sent to the client device, according to the inspection (at step 516). If it determines not to block the communication, the workflow 500 continues with validating the decrypted communication (originally sent from the server) to the client device (at step 508).

The workflow 500, at step 509, continues with the computing system determining whether or not to modify the decrypted communication (originally sent from the server) according to instructions from the client, the server, or the MITM component, and/or a set of rules stored in the computing system. If it determines to modify the communication, then the workflow 500 continues with modifying the communication according to the instructions from the client, the server, or the MITM component, and/or a set of rules stored in the computing system (at step 510). If it determines not to block the communication, the workflow 500 skips a modification of the communication and continues with re-encrypting the decrypted communication according to the surrogate certificate (at step 512). Either way, if the computing system determines that the communication is not to be blocked, the workflow 500 will eventually proceed with re-encrypting, by the computing system, the decrypted communication (originally sent from the server) according to the surrogate certificate (at step 512).

Finally, at step 514, the workflow 500 continues with the computing system sending the re-encrypted communication to the client device. The re-encrypted communication includes the same message, or a derivative of the message originally sent from the server.

Figure 6:
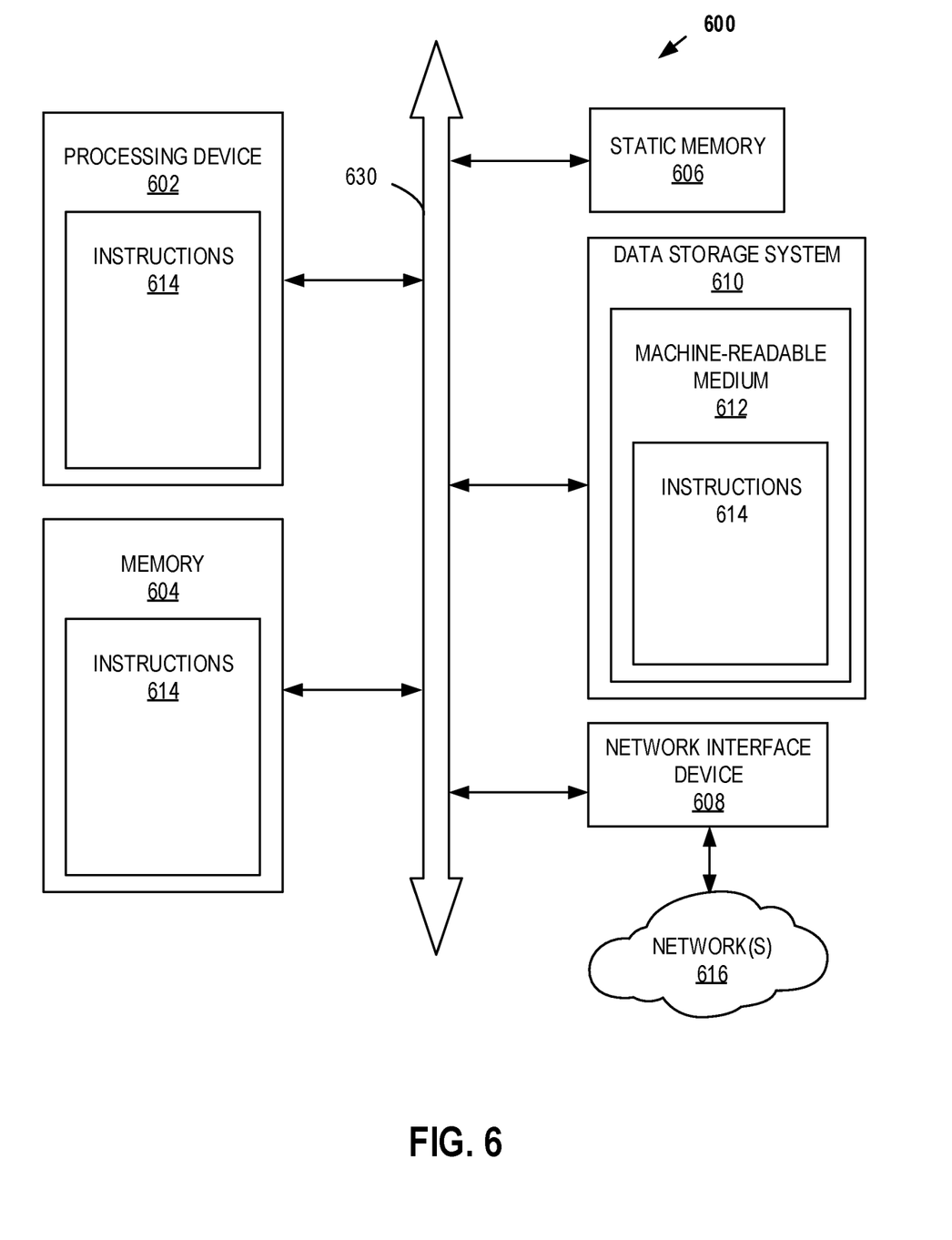
FIG. 6 is a block diagram of example technical aspects of an example computing system, in accordance with some embodiments of the present disclosure.

FIG. 6 is a block diagram of example technical aspects of an example computing system 600, such as a computing system that can implement workflows 300, 400, and 500. FIG. 6 illustrates parts of the computing system 600 within which a set of instructions, for causing the machine to perform any one or more of the methodologies discussed herein, can be executed. In some embodiments, the computing system 600 can correspond to a host system that includes, is coupled to, or utilizes memory or can be used to perform the operations of a controller (e.g., to execute an operating system to perform operations corresponding to the client devices 102a to 102c, one or more computing systems of the VPNAP 106, or the website or online app servers 120a to 120c). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computing system 600 includes a processing device 602, a main memory 604 (e.g., read-only memory (ROM), flash memory, dynamic random-access memory (DRAM), etc.), a static memory 606 (e.g., flash memory, static random-access memory (SRAM), etc.), and a data storage system 610, which communicate with each other via a bus 630.

The processing device 602 represents one or more general-purpose processing devices such as a microprocessor, a central processing unit, or the like. More particularly, the processing device can be a microprocessor or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations discussed herein. The computing system 600 can further include a network interface device 608 to communicate over one or more networks 616 which can include the LAN/WAN network(s) 104 and/or the Internet 118 depicted in FIG. 1.

The data storage system 610 can include a machine-readable storage medium 612 (also known as a computer-readable medium) on which is stored one or more sets of instructions 614 or software embodying any one or more of the methodologies or functions described herein. The instructions 614 can also reside, completely or at least partially, within the main memory 604 and/or within the processing device 602 during execution thereof by the computing system 600, the main memory 604 and the processing device 602 also constituting machine-readable storage media.

In one embodiment, the instructions 614 include instructions to implement functionality corresponding to the client devices 102a to 102c, a computing system of the VPNAP 106, or the servers 120a to 120c. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   intercepting, by a computing system of a virtual private network application platform (VPNAP), a request to change a transmission control protocol (TCP) connection to a secure sockets layer or transport layer security (SSL/TLS) connection between a client device and an application or website server, subsequent to the TCP connection being established between the client device and the server;

establishing, by the computing system of the VPNAP, an SSL/TLS connection with the server between the computing system and the server according to the request;

validating, by the computing system of the VPNAP, an original digital certificate sent from the server after the SSL/TLS connection between the computing system and the server has been established;

generating, by the computing system of the VPNAP, a surrogate digital certificate according to the original digital certificate;

sending to the client device, by the computing system of the VPNAP, a reply to the request, with the surrogate digital certificate,
  wherein the reply imitates the server replying to the request of the client device, and
  wherein the client device comprises a pre-installed trusted certificate authority certificate from the VPNAP; and controlling, by the computing system of the VPNAP, communications between the client device and the server according to the surrogate digital certificate, wherein the controlling, by the computing system of the VPNAP, the communications between the client device and the server, comprises:
  receiving an encrypted first communication sent from the client device, wherein the encrypted first communication is encrypted according to the surrogate digital certificate;
  decrypting the encrypted first communication sent from the client device according to the surrogate digital certificate;
  inspecting the decrypted first communication to determine whether to block the decrypted first communication or not;
  in response to determining to block the first communication, blocking the decrypted first communication from being re-encrypted and sent to the server, according to the inspection; and
  in response to determining not to block the decrypted first communication, validating the decrypted first communication:
    determining whether to modify the decrypted decrypted first communication or not;
    in response to determining to modify the decrypted first communication, modifying the decrypted first communication according to the determination to modify it;
    in response to determining not to modify the decrypted first communication, not modifying the decrypted first communication;
    subsequent to modifying or not modifying the decrypted first communication after the determination whether to modify the decrypted first communication or not, re-encrypting the decrypted first communication according to the original digital certificate; and
    sending the re-encrypted first communication to the server.

2. The method of claim 1, comprising establishing, by the computing system, the TCP connection between the client device and the server prior to the interception by the computing system.

3. The method of claim 1, wherein the controlling, by the computing system of the VPNAP, the communications between the client device and the server, comprises:
  receiving an encrypted second communication sent from the server, wherein the encrypted second communication is encrypted according to the original digital certificate;
  decrypting the encrypted second communication sent from the server according to the original digital certificate;
  re-encrypting the decrypted second communication according to the surrogate digital certificate; and
  sending the re-encrypted second communication to the client device.

4. The method of claim 1, wherein the controlling, by the computing system of the VPNAP, the communications between the client device and the server, comprises:
  receiving an encrypted second communication sent from the server, wherein the encrypted second communication is encrypted according to the original digital certificate;
  decrypting the encrypted second communication sent from the server according to the original digital certificate;
  inspecting the decrypted second communication; and
  blocking the decrypted second communication from being re-encrypted and sent to the client device, according to the inspection.

5. The method of claim 3, wherein the controlling, by the computing system of the VPNAP, the communications between the client device and the server, comprises inspecting and validating the decrypted second communication.

6. The method of claim 3, wherein the controlling, by the computing system of the VPNAP, the communications between the client device and the server, comprises modifying the decrypted second communication.

7. The method of claim 1, wherein the re-encrypted communication includes a same message originally sent from the client device.

8. The method of claim 1, wherein the re-encrypted communication includes a derivative of a message originally sent from the client device.

9. The method of claim 3, wherein the re-encrypted second communication includes a same message originally sent from the server.

10. The method of claim 3, wherein the re-encrypted second communication includes a derivative of a message originally sent from the server.

11. A system of a virtual private network application platform (VPNAP), comprising:
  a virtual private network (VNP), configured to establish a transmission control protocol (TCP) connection between a client device and an application or website server; and
  a computing system, configured to:
    intercept a request to change the TCP connection to a secure sockets layer or transport layer security (SSL/TLS) connection between the client device and the server;
    establish an SSL/TLS connection with the server according to the request;
    validate an original digital certificate sent from the server;
    generate a surrogate digital certificate according to the original digital certificate;

send, to the client device, a reply to the request with the surrogate digital certificate, wherein the reply imitates the server replying to the request of the client device, and
wherein the client device comprises a pre-installed trusted certificate authority certificate from the VPNAP; and
control communications between the client device and the server according to the surrogate digital certificate, and
with the control of the communications between the client device and the server, the computing system is further configured to:
receive an encrypted first communication sent from the client device, wherein the encrypted first communication is encrypted according to the surrogate digital certificate;
decrypt the encrypted first communication sent from the client device according to the surrogate digital certificate;
inspect the decrypted first communication to determine whether to block the decrypted first communication or not;
in response to determining to block the decrypted first communication, block the decrypted first communication from being re-encrypted and sent to the server, according to the inspection; and
in response to determining not to block the decrypted first communication, validate the decrypted first communication:
determine whether to modify the decrypted first communication or not;
in response to determining to modify the decrypted first communication, modify the decrypted first communication according to the determination to modify it;
in response to determining not to modify the decrypted first communication, not modify the decrypted first communication;
subsequent to modifying or not modifying the decrypted first communication after the determination whether to modify the decrypted first communication or not, re-encrypt the decrypted first communication according to the original digital certificate; and
send the re-encrypted first communication to the server.

12. The system of claim 11, wherein the computing system is configured to:
receive an encrypted second communication sent from the server, wherein the encrypted second communication is encrypted according to the original digital certificate;
decrypt the encrypted second communication sent from the server according to the original digital certificate;
re-encrypt the decrypted second communication according to the surrogate digital certificate; and
send the re-encrypted second communication to the client device.

13. The system of claim 11, wherein the computing system is configured to:
receive an encrypted second communication sent from the server, wherein the encrypted second communication is encrypted according to the original digital certificate;
decrypt the encrypted second communication sent from the server according to the original digital certificate;
inspect the decrypted second communication; and
block the decrypted second communication from being re-encrypted and sent to the client device, according to the inspection.

14. The system of claim 12, wherein the computing system is configured to inspect and validate the decrypted second communication.

15. The system of claim 12, wherein the computing system is configured to modify the decrypted second communication.

16. The system of claim 11, further comprising instructions, stored in memory of a computing system, comprising:
a set of operations, including functions configured to allow, block, or modify a communication, wherein the set of operations is grouped into a VPN application with an associated set of metadata describing the VPN application;
a set of rules configured to determine when to perform the functions; and
configuration information describing customizations to the functions, wherein the customizations are configurable on a per-end-user or per-end-user-device basis.

17. A non-transitory computer readable medium tangibly encoded with computer-executable instructions, that when executed by a processor associated with a computing device, performs a method comprising:
intercepting, by a computing system of a virtual private network application platform (VPNAP), a request to change a transmission control protocol (TCP) connection to a secure sockets layer or transport layer security (SSL/TLS) connection between a client device and an application or website server, subsequent to the TCP connection being established between the client device and the server;
establishing, by the computing system of the VPNAP, an SSL/TLS connection with the server between the computing system and the server according to the request;
validating, by the computing system of the VPNAP, an original digital certificate sent from the server after the SSL/TLS connection between the computing system and the server has been established;
generating, by the computing system of the VPNAP, a surrogate digital certificate according to the original digital certificate;
sending to the client device, by the computing system of the VPNAP, a reply to the request, with the surrogate digital certificate,
wherein the reply imitates the server replying to the request of the client device, and
wherein the client device comprises a pre-installed trusted certificate authority certificate from the VPNAP; and
controlling, by the computing system of the VPNAP, communications between the client device and the server according to the surrogate digital certificate,
wherein the controlling, by the computing system of the VPNAP, the communications between the client device and the server, comprises:
receiving an encrypted first communication sent from the client device, wherein the encrypted first communication is encrypted according to the surrogate digital certificate;
decrypting the encrypted first communication sent from the client device according to the surrogate digital certificate;
inspecting the decrypted first communication to determine whether to block the decrypted first communication or not;

in response to determining to block the decrypted first communication, blocking the decrypted first communication from being re-encrypted and sent to the server, according to the inspection; and in response to determining not to block the decrypted first communication, validating the decrypted first communication:
- determining whether to modify the decrypted first communication or not;
- in response to determining to modify the decrypted first communication, modifying the decrypted first communication according to the determination to modify it;
- in response to determining not to modify the decrypted first communication, not modifying the decrypted first communication;
- subsequent to modifying or not modifying the decrypted first communication after the determination whether to modify the decrypted first communication or not, re-encrypting the decrypted first communication according to the original digital certificate; and
- sending the re-encrypted first communication to the server.

18. The non-transitory computer readable medium of claim 17, wherein the controlling, by the computing system of the VPNAP, the communications between the client device and the server, comprises:
receiving an encrypted second communication sent from the server, wherein the encrypted second communication is encrypted according to the original digital certificate;
decrypting the encrypted second communication sent from the server according to the original digital certificate;
re-encrypting the decrypted second communication according to the surrogate digital certificate; and
sending the re-encrypted second communication to the client device.

19. The non-transitory computer readable medium of claim 17, wherein the controlling, by the computing system of the VPNAP, the communications between the client device and the server, comprises:
receiving an encrypted second communication sent from the server, wherein the encrypted second communication is encrypted according to the original digital certificate;
decrypting the encrypted second communication sent from the server according to the original digital certificate;
inspecting the decrypted second communication; and
blocking the decrypted second communication from being re-encrypted and sent to the client device, according to the inspection.

20. The non-transitory computer readable medium of claim 18, wherein the controlling, by the computing system of the VPNAP, the communications between the client device and the server, comprises inspecting and validating the decrypted second communication.

21. The non-transitory computer readable medium of claim 18, wherein the controlling, by the computing system of the VPNAP, the communications between the client device and the server, comprises modifying the decrypted second communication.

* * * * *